C. W. LUMMIS.

FEEDING MECHANISM FOR GAS PRODUCERS.

APPLICATION FILED SEPT. 28, 1918.

Reissued Nov. 12, 1918.

14,548.

3 SHEETS—SHEET 1.

Inventor
Charles W. Lummis.
By Attorney
Wm. H. Kenneally

C. W. LUMMIS.

FEEDING MECHANISM FOR GAS PRODUCERS.

APPLICATION FILED SEPT. 26, 1918.

Reissued Nov. 12. 1918.

14,548.

3 SHEETS—SHEET 2.

Inventor
Charles W. Lummis.
By Attorney
Geo. H. Kennedy Jr.

C. W. LUMMIS.

FEEDING MECHANISM FOR GAS PRODUCERS.

APPLICATION FILED SEPT. 28, 1918.

Reissued Nov. 12, 1918.

14,548.

3 SHEETS—SHEET 3.

Inventor
Charles W. Lummis.
By Attorney
Geo. H. Kennedy Jr.

UNITED STATES PATENT OFFICE.

CHARLES W. LUMMIS, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

FEEDING MECHANISM FOR GAS-PRODUCERS.

Specification of Reissued Letters Patent. Reissued Nov. 12, 1918.

14,548.

Original No. 1,270,963, dated July 2, 1918. Serial No. 55,551, filed October 12, 1915. Application for reissue filed September 28, 1918. Serial No. 256,125.

*To all whom it may concern:*

Be it known that I, CHARLES W. LUMMIS, a citizen of the United States, residing at Worcester, in the county of Worcester and Commonwealth of Massachusetts, have invented a new and useful Improvement in a Feeding Mechanism for Gas-Producers, of which the following, together with the accompanying drawings, is a specification.

The present invention relates to a feeding mechanism for gas producers and has particular reference to a mechanism of the above type for mechanically supplying fuel to a producer, by the introduction of successive intermittent charges, the mechanism being adjustable to vary the rate at which the charges are introduced, and also to vary the size of said charges, in accordance with the rate of consumption of fuel within the producer.

The mechanism belongs to that type of feeder which provides a movable fuel receptacle adapted, in one position to receive a charge of fuel from a chute, hopper or other source of supply, and subsequently, to deliver such charge into the combustion chamber of the producer. One object of my invention is to provide an arrangement and disposition of parts, whereby the operation of devices of this class is improved, with respect to obtaining the greatest possible freedom of movement for the fuel receptacle and, at the same time, permitting its movement to take place under conditions which eliminate the necessity for shearing through portions of the charge of fuel in the operation of sealing the producer chamber against the escape of gas.

The present invention, as regards the provision of a construction adapted to secure the foregoing objects, partakes of the principles of operation which characterize the mechanism shown and described in my United States Letters Patent No. 1,274,176, issued July 30, 1918; it differs therefrom, however, in the provision of positively acting fuel restraining devices, in conjunction with the fuel receptacle, to insure the unhindered sealing of the producer chamber against the escape of gas. The essential features of the present invention are set forth in the following description, reference being had to the accompanying drawings, in which—

Like reference characters refer to like parts in the different figures.

Figure 1:
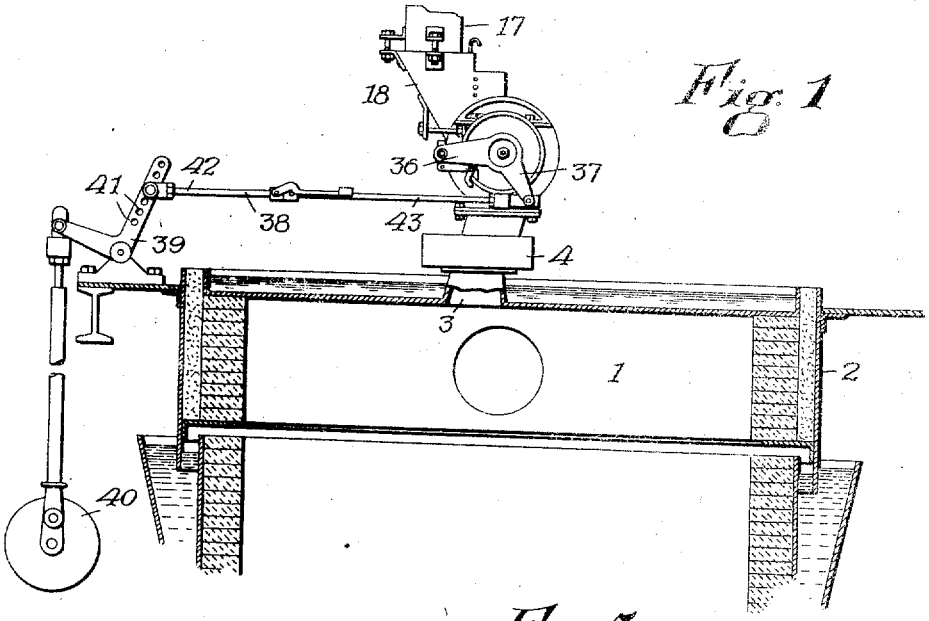
Figure 1 is a sectional view of a gas producer, equipped with fuel feeding means constructed according to this invention.
Figure 5:
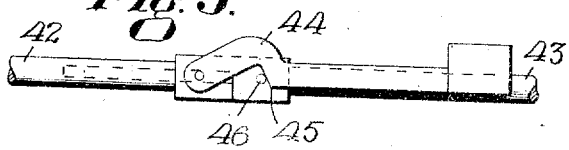
Fig. 5 is a detailed view of an actuating rod.

Referring to the accompanying drawings, the gas producer shown in Fig. 1 provides a combustion chamber 1 which is inclosed by a stationary cover section 2, the latter being preferably water cooled, and having an opening 3 in its top, for the entrance of fuel. The opening 3 communicates with the interior of a hollow water cooled shell 4 superposed upon the top of the producer, and providing for the support of the fuel feeding mechanism forming the subject matter of this invention.

The said fuel feeding mechanism consists of an open ended casting or cradle 5 providing a concave seat 6, from which opens downwardly a passage 7, communicating, through the shell 4 and opening 3, with the combustion chamber 1. Bolted to each flanged end of the cradle 5 is a plate 8, the said plates 8 providing alined vertical recesses 9 for the reception of adjustable bearing blocks 10, supported upon set screws 11.

Bearing blocks 10, 10, afford journals for trunnions 14, 14, which project from the ends of a cylindrical drum or receptacle 15. The latter is adapted to rotate in the concave seat 6, between the end plates 8, 8. As herein shown, the circumferential extent of the seating surface 6 of the cradle 5 is slightly less than one half the circumference of the drum 15, whereby the latter is free to move away from said seating surface during its rotation, since the cradle does not extend far enough around the drum for the parts ever to bind.

In other words, all danger of the drum sticking or binding in the cradle, by expansion or otherwise, is effectually prevented by thus limiting the seating surface to not more than one half the circumference of the drum, thereby permitting said drum and its trunnions to move not only rotatively, but also away from said seating surface. Movement away from the seating surface is limited by means of adjustable set screws 13, 13, carried by plates 12, 12, which project upwardly from the plates 8, 8. These set screws 13 13, are adapted to bear lightly against the upper ends of the blocks 10, 10, when the drum is in operation. That is, the set screws 13, 13, are set up loosely when the feeding mechanism is cold; after the producer is started, and the parts have heated up and expanded in the normal operation, these set screws allow the drum to assume a position for free rotative movement in the cradle, while at the same time holding it properly to its work. In the event of undue or unusual heating and expansion of the drum, the set screws 13, 13, may be still further slackened off, as will be readily understood. In other words, these set screws perform by their adjustability, in effect, the same function as a yielding spring or a weight, except that in practice they afford a better means of holding the drum to its work and thus prevent any accumulation of tar or dirt on the contacting surfaces of the drum and cradle. Above this effective seating surface 6, which, as above stated, is disposed entirely below the axis of rotation of the drum, the cradle provides on one side a lip or extension 16, terminating above the axis of rotation of the drum, and out of contact with the drum, so that it does not constitute part of the seating surface afforded by the cradle. This extension 16 serves to guide the fuel, and prevent its spilling outward from the drum, as hereinafter more particularly set forth.

A fuel spout 17 leading from the hopper, or other source of fuel supply, has suspended therefrom a trough or chute 18, the longitudinal axis of which may be inclined with respect to the perpendicular, with its delivery end disposed adjacent the surface of the drum 15 at one side of the axis thereof. The flow of fuel from the spout 17 through the chute 18 against the wall of the drum 15 is controlled by a sliding gate 19, which is adjustable up and down to vary the distance of its lower end from the bottom of the chute 18, and thereby to vary the effective fuel opening afforded by the delivery end of said chute. The adjustment of the gate 19 is determined by the position of a transverse rod 20, removably carried within an upturned portion of the gate, there being a series of vertically spaced holes 21 in the side walls of said chute, to receive the ends of said rod. In this manner the area of fuel resting by gravity against the surface of the drum, and supporting the column of fuel contained within the inclined chute 18 and the spout 17, is varied.

The drum 15 has a longitudinal opening 22 in its wall; the circumferential extent of this opening is approximately one-sixth the circumference of the drum. It will be seen that this opening must be of less width than the effective sealing surfaces of the seat 6 of the cradle on opposite sides of the passage 7, since, in the rotation of the drum, in the direction of the arrow, Fig. 2, communication between its interior, and the interior of the producer, must be completely closed before the leading edge of the opening arrives at the delivery end of the chute 18. In the same way, the rear edge 23 of the opening 22 must pass into contact with the actual seating surface 6 before the leading edge of said opening begins to uncover the passage 7; the arrival of said edge 23 at the point 23′, Fig. 2, where the effective seating surface of the cradle begins, effects the necessary sealing of the producer chamber against the escape of gas.

Figure 2:
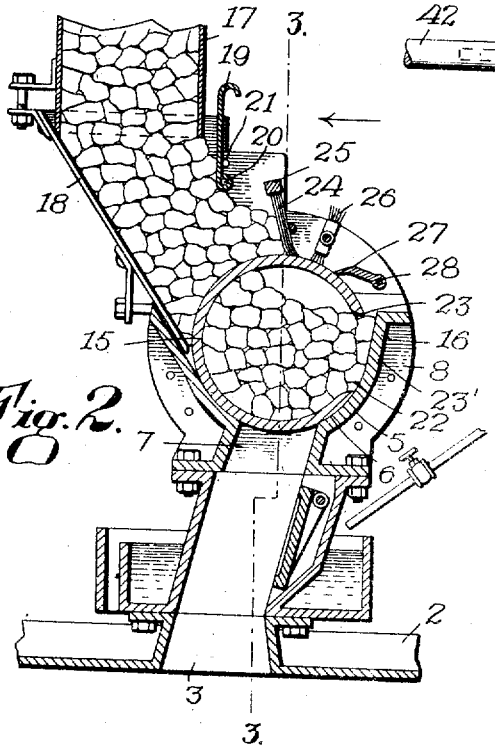
Fig. 2 is a cross sectional view through the feeding mechanism in a plane at right angles to the section of Fig. 1.
Figure 3:
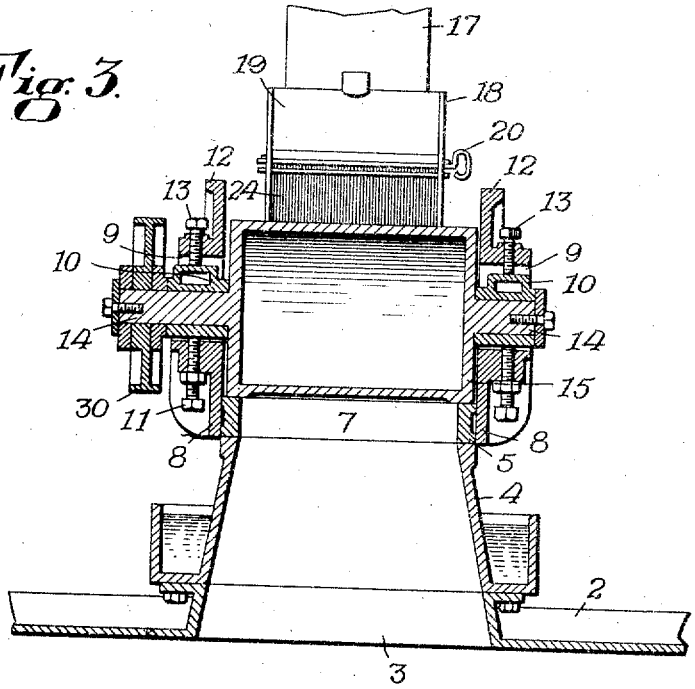
Fig. 3 is a sectional view of the feeding mechanism in the plane of the line 3—3, Fig. 2.

The chute 18 is entirely open on its upper side; however, means must be provided for preventing the fuel from being carried out of the chute by the rotation of the drum, and such means conveniently take the form of a flexible guard which, while holding back the greater portion of the fuel, will allow the large lumps caught in the opening 22 to pass forward without damage to the feeder, or without raising the guard throughout its entire length; as shown in Figs. 2 and 3, stiff wire brushes 24 having their ends in scraping contact against the periphery of the drum, are employed for this purpose. Said brushes are carried upon a bar 25 supported by the plates 12, 12, at the ends of the cradle.

It is necessary to provide, in this connection, devices for removing tar and coal dust from the surface of the drum and such devices are embodied in wire brushes 26 disposed in advance of the fuel retaining brushes 24. If desired, a scraper 27 pivoted on a rod 28 extending between the plates 12, 12, may be employed, with its free end resting upon the surface of the drum, for the purpose of removing coal dust, and preventing the passage of small particles of coal which may have passed the brushes 24 and 26, from being carried onto the supporting and sealing surfaces afforded by the cradle 5.

Figure 6:
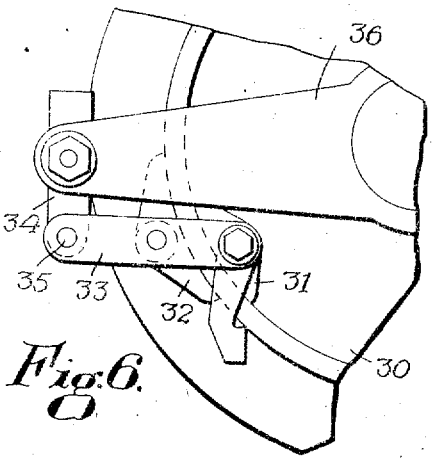
Fig. 6 is a fragmentary view of the driving mechanism associated with the feeding device.
Figure 4:
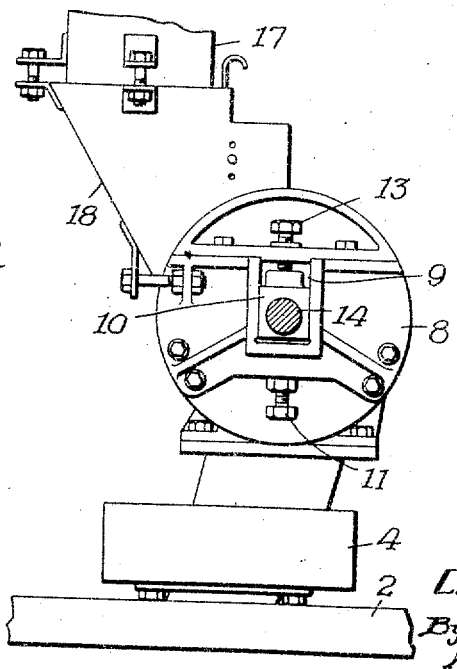
Fig. 4 is an end view of the feeding mechanism.

As a means for imparting rotation to the drum, one of the trunnions 14 carries a flanged disk 30, providing inner peripheral surfaces for engagement by a pair of friction shoes 31, one only being shown, and an outer peripheral surface for engagement by a single friction shoe 32, Fig. 6. Said shoes 31 and 32 are pivotally mounted on a bifurcated link 33 which extends inwardly from the lower end of a toggle lever 34 being pivotally attached thereto at 35. The toggle lever 34 is carried on the free end of an arm 36 of a bell crank, journaled on said trunnion 14, the other arm 37 of said bell crank having a pivotal connection with a two-part horizontal connecting rod 38, pivotally attached at its other end to a rocking arm 39. The arm 39 is oscillated through the medium of an eccentric 40 and is provided with a series of holes 41, whereby the pivotal connection thereto of the rod 38 may be changed, to vary the stroke of said rod. The reciprocation of the rod 38 effects a step-by-step rotation of the drum through the action of the friction shoes 31 and 32, the movement of the rod 38, to the left, Fig. 1, causing said shoes to bind upon the flanges of the disk 30, thereby carrying the drum in the direction of the arrow, Fig. 2, while the movement of the rod 38 to the right carries the shoes 31 and 32 out of frictional contact with the rims of the disk, with the result that the drum remains stationary during such movement. The connecting rod 38 is constructed in such a manner that an undue resistance to the rotation of the drum will enable said rod to become ineffective in rotating the drum until such resistance is removed. To this end the rod is made in telescopic sections 42 and 43, one of which, 42, has pivoted thereto a weighted latch 44 providing a shouldered cam surface 45 for engagement by a transversely projecting pin 46 carried by the other section 43. Under normal conditions the thrust of the section 42 to the left of Figs. 1 and 4 is sustained by the pin 46, causing the shoes 31 and 32 to operate in moving the drum in the manner above described; if, however, the resistance to such movement exceeds a predetermined limit, the inclined surface 45 rides upwardly on the pin, lifting the latch 44 and moving the part 42 independently of the part 43, whereupon no motion in an operative direction is imparted to the bell crank 35—36.

The intermittent rotation of the drum 15, in the manner above described, provides for the isolation of charges of fuel therein, and the subsequent introduction of the same into the combustion chamber of the producer. Each charge is usually less than the total capacity of the drum; the size of the charges may be varied by adjustment of the gate 19, and the rate at which successive charges are introduced may be varied by adjustment of the stroke of rod 38, through its connection with arm 39.

Obviously, the drum 15, instead of rotating always in one direction, as shown, may have imparted thereto an oscillating movement, to carry its opening 22 alternately back and forth, into registry with the end of the chute 18 and the passage 7, respectively.

It will be apparent that the adaptation of a fuel feeder of the above type to a gas producer, requiring at all times the maintenance of a seal against the escape of gas, involves a construction in which the rear edge 23 of opening 22 moves into sealing contact with the seat 6 of cradle 5 before the forward edge of said opening arrives at the passage 7, in order to seal the producer chamber against the escape of gas. It is proper to say, therefore, that the arrival of the edge 23 at a plane where it makes sealing contact with the seat 6 of the cradle fixes and determines a sealing edge for the feeder, in the operation of discharging the contents of the receptacle into the producer chamber. In the same way, the arrival of said edge 23 at a plane where it makes sealing contact with the seat 6, on the opposite side of the passage 7, effectually prevents the escape of gas from the producer chamber, in the operation of moving the receptacle into position to receive a charge, since said edge 23 must arrive upon the seat 6 before the forward edge of opening 22 passes off the seat. It follows, therefore, that in confining the effective sealing surface of the cradle to not more than one half of the circumference of the drum, for the purpose heretofore set forth, the maximum width of the opening 22 is limited to somewhat less than one sixth of the circumference of the drum, as clearly shown in Fig. 2.

This sealing edge 23′, in the operation of discharging the receptacle, being located at or below the horizontal plane containing the axis of rotation of the receptacle, it is clear that in the absence of any restraining means for the fuel isolated within the drum, a spilling of fuel through the opening 22, as the latter approached the vicinity of the sealing edge 23′ would result. Moreover, under the condition above described, the rear edge 23 of said opening would be called upon to shear through the fuel, as the said edge approached its sealing position, causing an undue resistance to the movement of the drum and, therefore, precluding the successful operation of the feeding mechanism.

Owing, however, to the provision of the lip or extension 16, the fuel spilling through the opening 22 is effectually confined, as shown in Fig. 2, the construction being such that while the advantages incident to the provision of a cradle embracing not more than one half the circumference of the drum are retained, yet there is no exposed edge for the fuel spilling through opening 22 to catch upon, in a manner to retard the movement of the drum. On the contrary, the lip or extension 16 gradually guides and urges the fuel inward, so that the rear edge 23 is not called upon to shear through the fuel, as said edge moves into sealing contact with the surface of the cradle.

Figure 7:
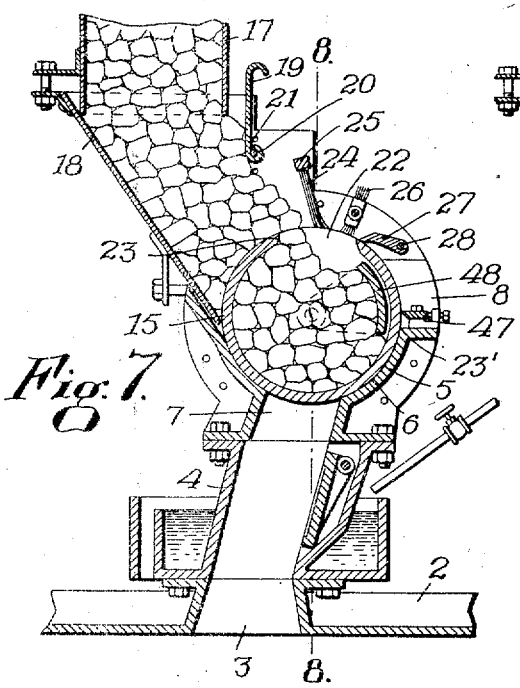
Fig. 7 is a view similar to Fig. 2, showing a modification of the fuel feeding mechanism within the scope of the present invention.
Figure 8:
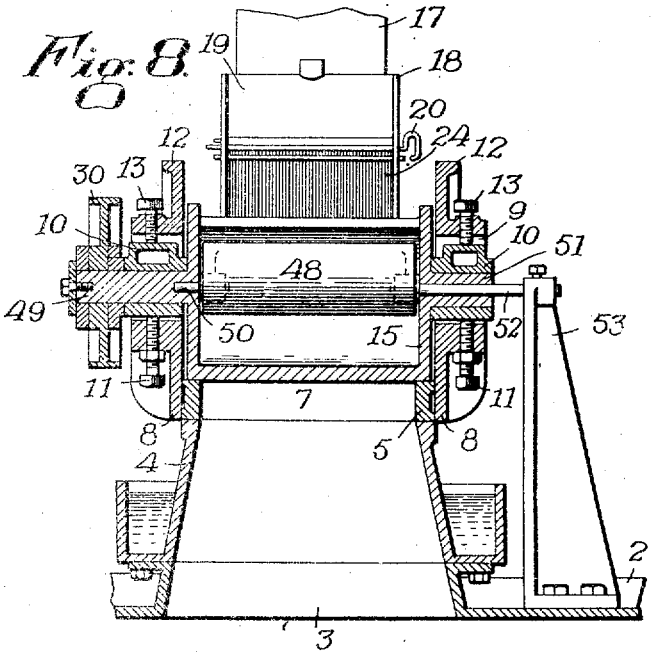
Fig. 8 is a sectional view, in the plane of the line 8—8, Fig. 7.

In the form of device shown in Figs. 7 and 8, there is no extension of the wall of the cradle 5 beyond the sealing edge 23′, which, like the sealing edge 23′ in the form of device shown in Fig. 2, is located below the axis of rotation of the drum 15. If desired, a rigid scraper 47 supported by this edge of the cradle may be provided, for further preventing the access of foreign matter to the seat 6; this scraper may be adjustable toward and from the surface of the drum to scrape the tar therefrom.

As a means for preventing the spilling of the fuel through the opening 22, as said opening approaches the sealing edge 23′, this construction provides a stationary shield or guard 48, disposed interiorly of the drum 15. One trunnion 49 of drum 15 is recessed to receive a concentric projection 50 on the corresponding end of the guard; the other trunnion 51 is centrally apertured for the passage of a shaft 52 projecting from the corresponding end of the guard, and held stationary by means of its attachment to a bracket 53 carried by the producer cover 2. In this manner the guard 48 is held stationary, while permitting the rotation of the drum 15 in the same manner as described in connection with the device shown in Fig. 2. The construction shown in Figs. 7 and 8 involves no other departures from the construction shown in Fig. 2, and the operation thereof is substantially the same, with respect to the ultimate results. In this construction the guard 48 prevents any fuel from spilling through the opening 22, as said opening approaches the vicinity of the sealing edge 23′, so that the movement of the rear edge 23 of said opening into contact with said sealing edge is unhindered, and all the advantages incident to the provision of a cradle embracing not more than one half the circumference of the drum are retained.

Figure 9:
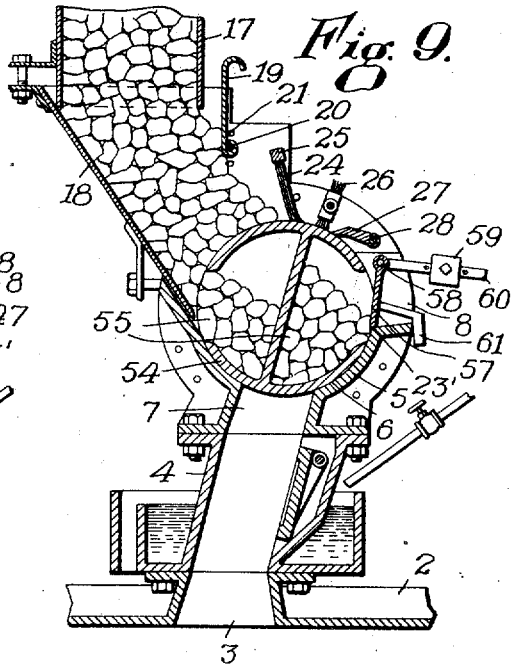
Fig. 9 is another view similar to Fig. 2, showing still another modification of a fuel feeding mechanism embodying my invention.

In the form of device illustrated in Fig. 9, the use of a guard member for preventing the spilling of coal through the drum opening is contemplated, but in this instance the guard is disposed exteriorly of the drum, enabling thereby the use of a drum 54 having a plurality of independent fuel compartments 55, 55, in the present instance two being shown, the diametrically opposite openings 56, 56, of said compartments serving for the intake and discharge of fuel with respect to the corresponding compartments in precisely the same manner as the opening 22 of the single compartment drum.

The spilling of the fuel through said openings 56, as the latter are successively moved into the vicinity of the sealing edge 23′ of the cradle 5, is prevented by a swinging plate or guard 57 carried by a pivoted shaft 58 which extends between the end plates 8, 8, of the cradle. The lower free end of the plate 57 hangs just above the sealing edge 23′, and is urged inwardly by a weight 59 adjustable on an arm 60 carried by shaft 58, to vary the force with which the plate 57 acts on the fuel to prevent its access to the sealing edge 23′. To limit the inward swinging movement of the lower end of plate 57, under the influence of weight 59, a stop 61 attached to said plate and adapted to contact with the wall of cradle 5 may be provided.

The above described modification of my invention, enabling the use of a multiple compartment drum, produces the same results as the previously described forms, the plate 57 serving to keep the sealing edge 23′ of the cradle free of fuel, thereby insuring all the advantages incident to the provision of a cradle embracing not more than one half the circumference of the drum.

It is to be understood that the term "sealing edge," as hereinafter used in the annexed claims, has reference to the hereinbefore described location determined by the arrival of the rear edge 23 of the opening 22 in effective sealing contact with the seat 6 of cradle 5, and with reference to the three forms of the invention herein shown and described, is designated by the numeral 23′.

The provision of a substantially gas tight seal, by the coöperation of the drum with the seating surface of the cradle, as hereinafter specified in the annexed claims, has reference merely to such a seal as would preclude the excessive escape of gas from the combustion chamber of the producer, and is not to be construed as limiting said claims to a construction providing a drum and cradle fitted with such exactitude that no leakage of gas could take place. Furthermore, it is to be understood that with respect to the provision of a seating surface for the drum, effective with respect to not more than one half the circumference of said drum, the invention is not limited to a cradle or support whose concave metallic seating surface of itself conforms to these requirements; on the other hand, a cradle or support providing a concave seat which is of greater radius than the drum, and embraces more than one half the circumference thereof, and which is enabled to make a substantially gas tight fit therewith by reason of the accumulation and deposit of tar, or the like, on said seat, is deemed to be fully within the contemplation of the invention as affording a seating surface effective with respect to not more than one half the circumference of the drum.

The advantages accruing from such a seating surface will be apparent when it is remembered that no restraint is imposed on an initial lifting movement of the drum off its seat, such as would be caused by expansion of the drum, or by a coating of tar, or the like, on its surface. On the other hand, if the effective seating surface coöperating with the drum to form a substantially gas tight seal embraces more than one half of the circumference of the drum, it is impossible for the latter to move upwardly, and hence sticking and binding of the latter would inevitably take place under the conditions above enumerated.

I claim—

1. In a fuel feeding mechanism for gas producers, a rotatable charging member, a supporting means for said member providing a seating surface therefor effective with respect to not more than one half the circumference of said member, whereby the free movement of said member away from said seating surface is permitted, and means for restraining the escape of fuel from said member, beyond said seating surface.

2. In a fuel feeding mechanism for gas producers, a rotatable member having a fuel discharge opening, a supporting means for said member providing a seating surface therefor effective with respect to not more than one half the circumference of said member, whereby the free movement of said member away from said seating surface is permitted, and means for preventing the escape of fuel past said discharge opening as the latter is moved toward said seating surface by the rotation of the member.

3. In a fuel feeding mechanism for gas producers, a rotatable member having a fuel discharge opening, a supporting means for said member providing a seating surface therefor effective with respect to not more than one half the circumference of said member, whereby the free movement of said member away from said seating surface is permitted, and means, above said seating surface, for preventing the escape of fuel past said discharge opening as the latter is moved toward said seating surface by the rotation of the member.

4. In a fuel feeding mechanism for gas producers, a rotatable charging member, and a supporting means therefor providing a concave seating surface effective with respect to not more than one half the circumference of said member, whereby the free movement of said member away from said seating surface is permitted, and also providing an extension from said seating surface in noncontacting relation to said member.

5. In a fuel feeding mechanism for gas producers, a rotatable charging member, a supporting means therefor providing a sealing edge, said supporting means effectively embracing not more than one half the circumference of said member, whereby free movement of said member away from said supporting means is permitted, and means for guiding the fuel within said member past said sealing edge.

6. In a fuel feeding mechanism for gas producers, a rotatable charging member, a supporting means therefor providing a sealing edge, said supporting means effectively embracing not more than one half the circumference of said member, whereby free movement of said member away from said supporting means is permitted, and means above said sealing edge for restraining the outward movement of fuel from said member.

7. In a fuel feeding mechanism for gas producers, a rotatable charging member having a fuel discharge opening, a supporting means therefor providing a sealing edge, said supporting means effectively embracing not more than one half the circumference of said member, whereby free movement of said member away from said supporting means is permitted, and means for preventing the lodgment of fuel between said edge and the rear edge of said opening.

8. In a fuel feeding mechanism for gas producers, a rotatable charging member having a fuel discharge opening, a supporting means therefor providing a sealing edge, said supporting means effectively embracing not more than one half the circumference of said member, whereby free movement of said member away from said supporting means is permitted, and means for constraining the fuel escaping through said opening to move past said sealing edge.

9. In a fuel feeding mechanism for gas producers, a rotatable charging member having a fuel discharge opening, a supporting means therefor providing a sealing edge, said supporting means effectively embracing not more than one half the circumference of said member, whereby free movement of said member away from said supporting means is permitted, and an extension on said supporting means above said sealing edge and in noncontacting relation to said member.

10. In a fuel feeding mechanism for gas producers, a rotatable member having a fuel discharge opening, a supporting means for said member providing a seating surface therefor effective with respect to not more than one half the circumference of said member, whereby free movement of said member away from said seating surface is permitted, and means within said member for preventing the escape of fuel past said discharge opening as the latter is moved toward said seating surface by the rotation of the member.

11. In a fuel feeding mechanism for gas producers, a rotatable member having a fuel discharge opening, a supporting means for said member providing a seating surface therefor effective with respect to not more than one half the circumference of said member, whereby free movement of said member away from said seating surface is permitted, and pivoted means for preventing the escape of fuel past said discharge opening as the latter is moved toward said seating surface by the rotation of the member.

12. In a fuel feeding mechanism for gas producers, a rotatable member having a fuel discharge opening, a supporting means for said member providing a seating surface therefor effective with respect to not more than one half the circumference of said member, whereby free movement of said member away from said seating surface is permitted, and yielding means for preventing the escape of fuel past said discharge opening as the latter is moved toward said seating surface by the rotation of the member.

13. In a fuel feeding mechanism for gas producers, a rotatable charging member, a supporting means therefor providing a concave seating surface, the sealing edge of said surface being disposed in or below the plane containing the other edge of said surface and the axis of rotation of said member, and means for guiding the fuel within said member past said sealing edge.

14. In a fuel feeding mechanism for gas producers, a rotatable charging member having an opening, a supporting means for said member providing a concave seat having a passage to the producer chamber for registration with said opening, means for segregating a charge of fuel in said member, and means for preventing the lodgment of fuel between the edge of said seat and the rear edge of said opening, in the rotation of said member.

15. In a fuel feeding mechanism for gas producers, a rotatable charging member having an opening, a supporting means for said member providing a concave seat having a passage to the producer chamber for registration with said opening, means for segregating a charge of fuel in said member, and means for preventing the lodgment of fuel between the edge of said seat and the rear edge of said opening, in the rotation of said member, the member and said seat coöperating to form a substantially gas tight seal against the escape of gas from the producer chamber in every position of said member.

Dated this eighteenth day of September, 1918.

CHARLES W. LUMMIS.

Witnesses:
RUFUS B. FOWLER,
NELLIE WHALEN.